July 12, 1927.
A. SCHROEDER
1,635,506
PROCESS OF AND MACHINE FOR MAKING CONTAINERS
Filed May 20, 1925          6 Sheets-Sheet 1
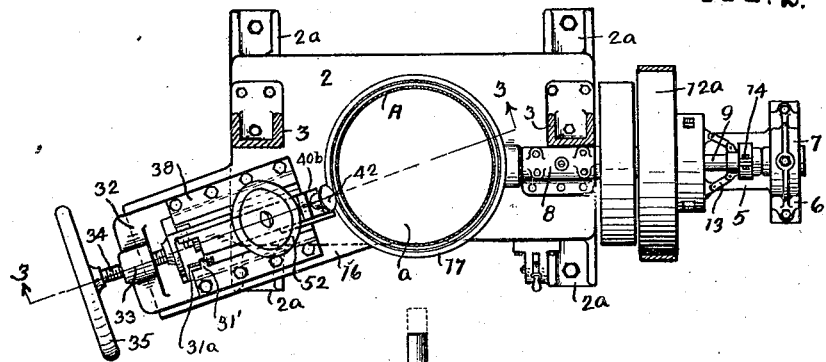
Inventor
Anthony Schroeder
By Geo. A. Pitts
Attorney

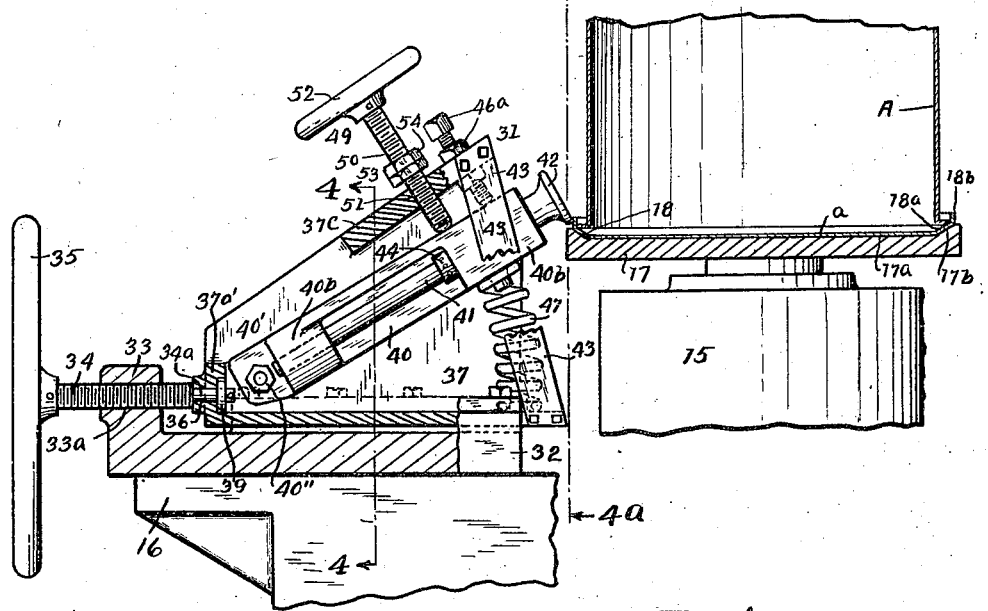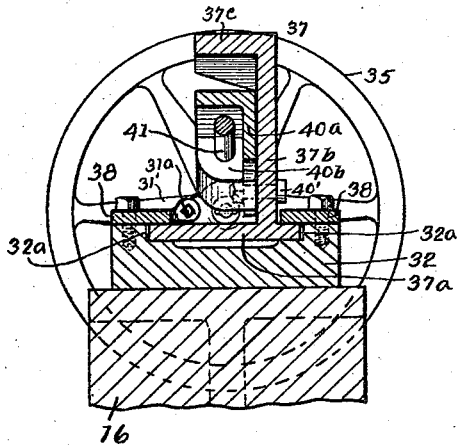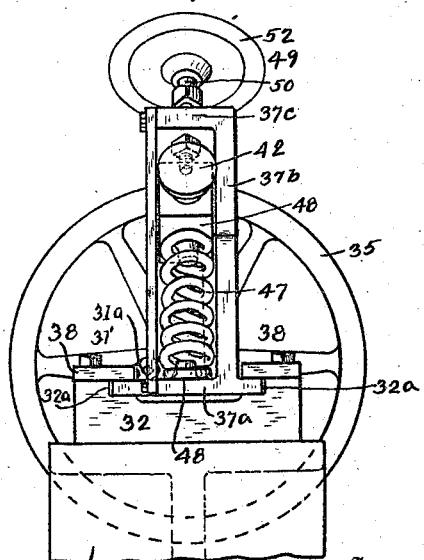

July 12, 1927.
A. SCHROEDER
1,635,506
PROCESS OF AND MACHINE FOR MAKING CONTAINERS
Filed May 20, 1925 6 Sheets-Sheet 3
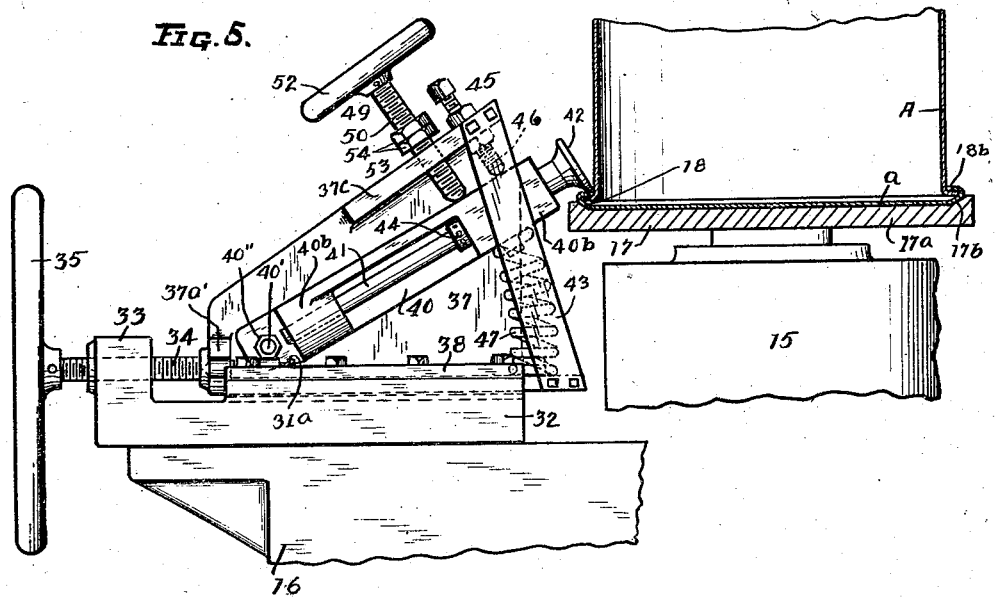
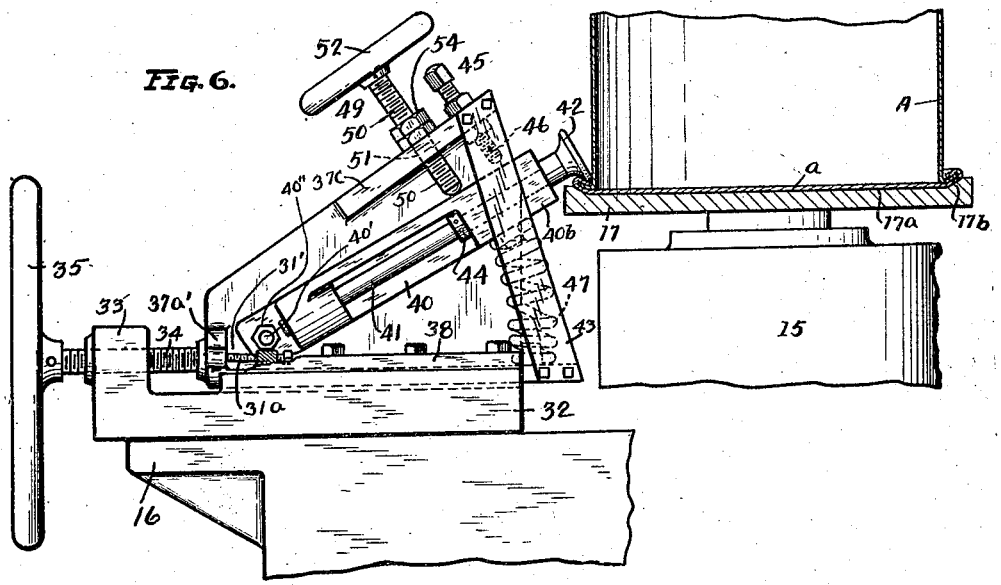
Inventor
Anthony Schroeder
By Geo. A. Ritts
Attorney

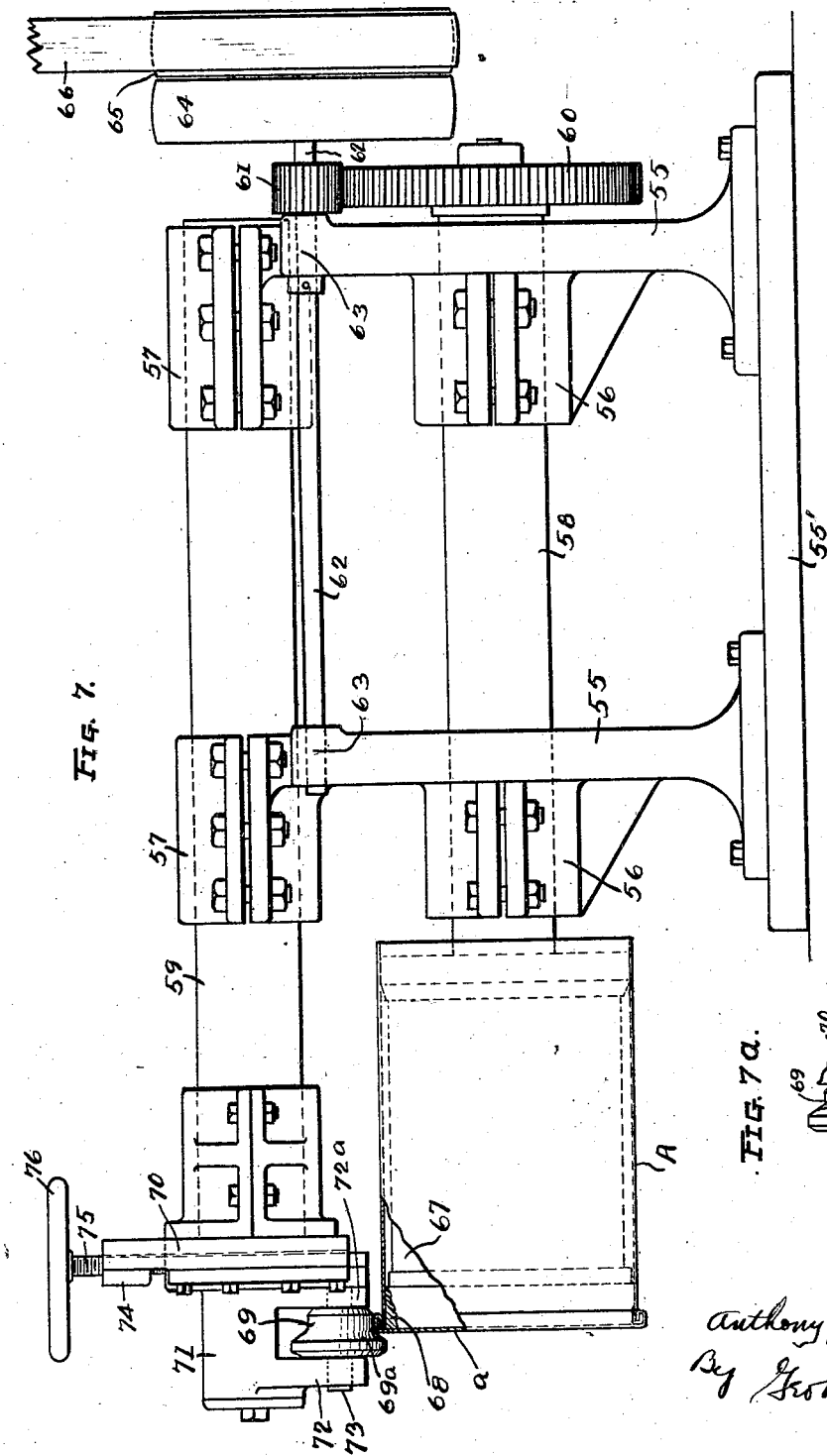

July 12, 1927.  
A. SCHROEDER  
1,635,506  
PROCESS OF AND MACHINE FOR MAKING CONTAINERS  
Filed May 20, 1925    6 Sheets-Sheet 5
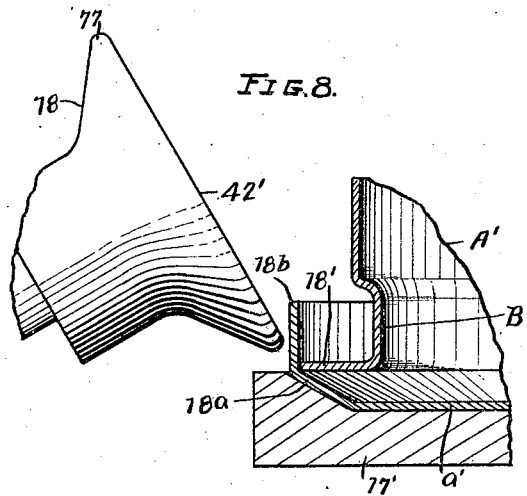
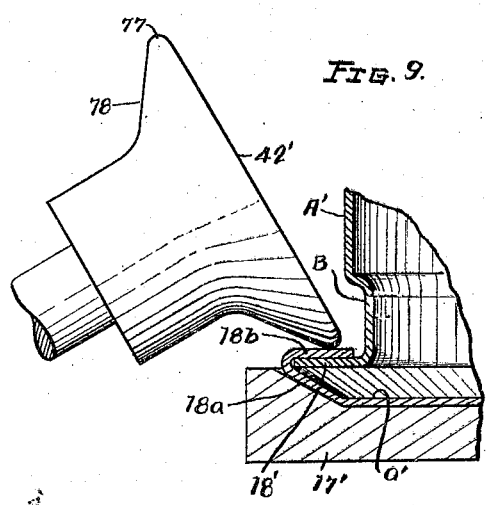
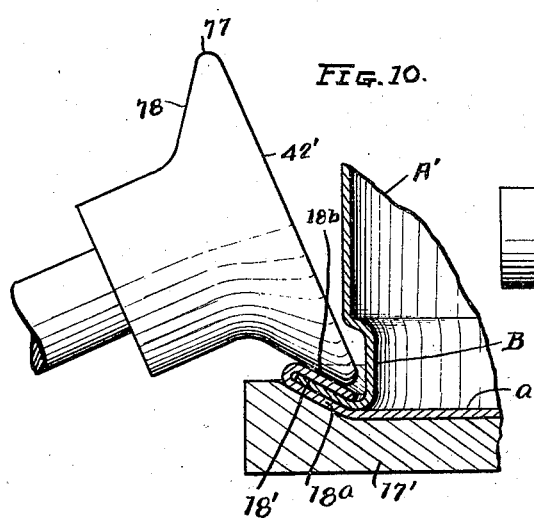
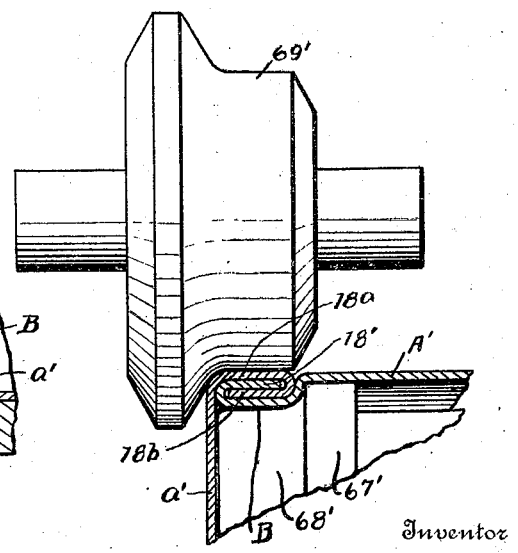
Inventor  
Anthony Schroeder  
By Geo. N. Potts  
Attorney July 12, 1927.
A. SCHROEDER
1,635,506
PROCESS OF AND MACHINE FOR MAKING CONTAINERS
Filed May 20 1925    6 Sheets-Sheet 6
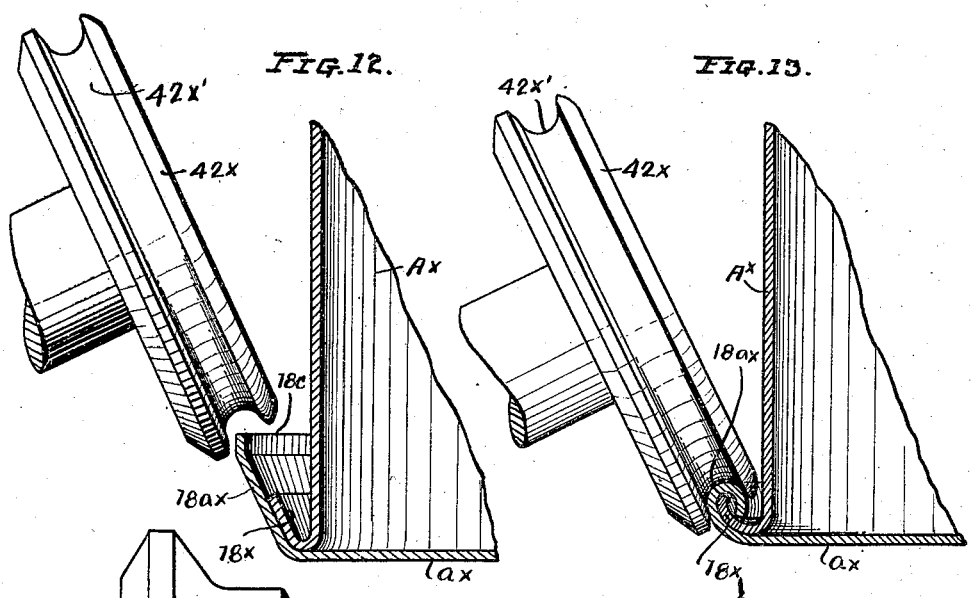
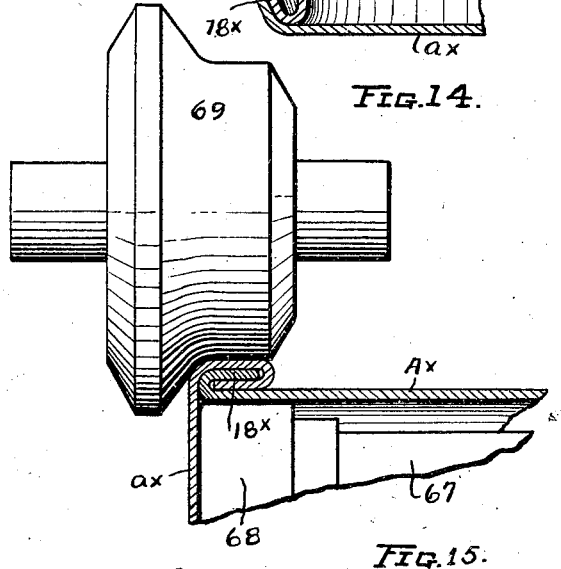
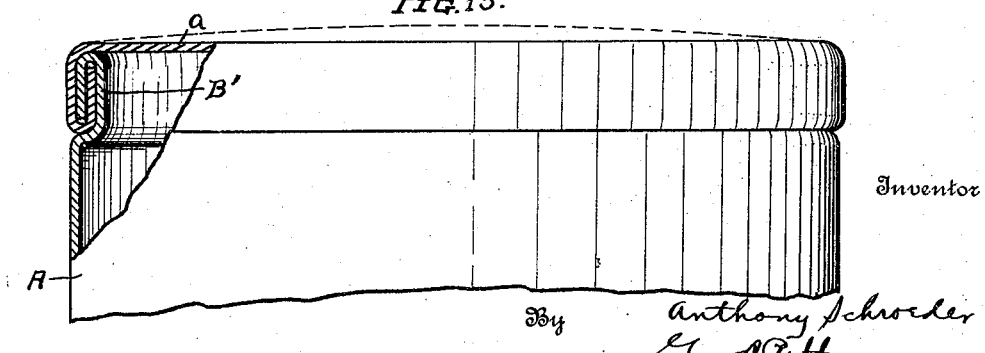
Inventor
Anthony Schroeder
By Geo. A. Pitts  Attorney Patented July 12, 1927.

1,635,506

UNITED STATES PATENT OFFICE.

ANTHONY SCHROEDER, OF CLEVELAND, OHIO, ASSIGNOR OF ONE-HALF TO JAMES MERLE FINNEY, OF CLEVELAND, OHIO.

PROCESS OF AND MACHINE FOR MAKING CONTAINERS.

Application filed May 20, 1925. Serial No. 31,530.

This invention relates to mechanism for heading or seaming heads on the bodies of metal containers, storage tanks and receptacles for dispensing mechanisms and the process of forming, folding and rolling the seams between the heads and the bodies thereof. The invention may be applied to the manufacture of containers for storing or shipping purposes, sometimes termed steel barrels or drums. It will be obvious that the invention may be used for making such containers or tanks of varying sizes and formed from sheet metal of different gage, as desired. The invention is particularly useful in the manufacture of containers, tanks and receptacles having the seams for their heads disposed around the side walls of the containers, tanks or receptacles, so that the heads will be flat and not provided with up-standing rims (usually referred to as chimes) around the edges of the heads.

One object of the invention is to provide an improved seaming mechanism of relatively simple construction and capable of folding and interlocking the flanges of a container body and a head therefor to form a seam in a rapid and ready manner, whereby the amount of labor usually required is reduced and greater output results.

Another object of the invention is to provide an improved mechanism for seaming the flanges of a container body and a head therefor wherein the head is flat and disposed in a plane at one end of the container body.

Another object of the invention is to provide an improved process of seaming the flanges of a container body and a head therefor in such manner that the resultant seam extends around the side of the body to secure or lock the head thereto, to produce a container in which the head, instead of being disposed in a plane within the end of the body and forming an outwardly extending chime or rim, is disposed in the plane of the body end to provide a flat or substantially flat end for the container.

Another object of the invention is to provide an improved process of seaming heads on container bodies wherein the steps of the process may be effected in a rapid and easy manner.

Another object of the invention is to construct an improved seaming machine wherein provision is made for supporting the head and body with their flanges in concentric relation to each other and the axis about which they rotate during the seaming operation and for insuring this relation while seaming of the flanges is effected.

Another object of the invention is to construct a metal container, tank or receptacle of improved construction wherein its head is disposed at one end of the body securely seamed thereto around its side wall.

Another object of the invention is to provide an improved seaming mechanism and process of seaming a head or top on a tank body whereby the appearance of the finished tank is improved and its surface lends itself for decoration purposes, the tank may be readily cleaned and the accumulation of grit, dirt and material is avoided.

Other objects of the invention will be apparent to those skilled in the art to which my invention relates from the following description taken in connection with the accompanying drawings, wherein Fig. 1 is an elevation of a mechanism embodying my invention and capable of use in connection with the carrying out of certain steps of my improved process.

Fig. 2 is a section on the line 2—2 of Fig. 1.

Fig. 3 is a fragmentary section on the line 3—3 of Fig. 2; the seaming roller being in its first or starting position.

Fig. 4 is a section on the line 4—4 of Fig. 3.

Fig. 4ª is a view on the line 4ª—4ª of Fig. 3, looking in the direction of the arrows.

Fig. 5 is a fragmentary section similar to Fig. 3, but showing the position of the seaming roller when operated to its second position in carrying out one step of my process.

Fig. 6 is similar to Fig. 5, but shows the position of the seaming roller when operated to its third position in carrying out another step of my process.

Fig. 7 is a side elevation of a machine for rolling the seam into final position.

Fig. 7ª is a fragmentary section showing the rolling of the seam into final position, where the container is of the construction shown in Figs. 8, 9, 10 and 11.

Figs. 8, 9, 10 and 11 are fragmentary views (enlarged) similar to portions of Figs. 3, 5, 6 and 7, respectively, but showing a slightly modified form of container construction, wherein the body is provided with an annular recess to receive the resulting seam, thereby providing containers in which the sides are cylindrical from end to end and the ends thereof are flat.

Fig. 12 is a fragmentary view of a seaming roller, in elevation and the container body and a head therefor in section, showing a modified form of mechanism embodying my invention; the seaming roller being in its first or starting position.

Fig. 13 is a view similar to Fig. 12, but showing the position of the roller when operated to its second position to carry out one step of the process, which, in the use of this form of mechanism, is somewhat simplified.

Fig. 14 is a fragmentary view showing the final operation of rolling down the seam.

Fig. 15 is a fragmentary view of a container made according to my process, parts being broken away.

In the drawings, 1 indicates as an entirety a frame. The frame 1 may comprise a table or bed 2, supported on suitable legs $2^a$, and a pair of upright members 3 connected at their upper ends by a cross member 4. The members 3 may be spaced to receive between them the largest sized tank desired to be made on the machine. The frame 1 may also be provided with a member 5 extending laterally from one side of the machine.

The elements of the frame, just referred to, may be integrally connected or otherwise formed. At its remote or outer end, the extension member 5 is provided with an upright shaft hanger 6, provided with bearings 7. The bearings 7 and bearings 8 provided on the adjacent end of the table 2, support a shaft 9, the purpose of which will be later set forth.

10 indicates a vertical shaft mounted in suitable bearings provided centrally of the table 2. 11 indicates a gear fixed to the shaft 10. The gear 11 is preferably a bevel gear and is driven by a bevel pinion (not shown) on the inner end of the shaft 9. 12 indicates as an entirety the driving means for the shaft 9. The driving means 12 preferably comprises a pulley $12^a$, loosely mounted on the shaft 9, and clutch elements 13. One clutch element is fixed to the pulley $12^a$; the other clutch element is splined to the shaft 9 and connected with and released from the first mentioned element by a lever 14, in a well known manner.

15 indicates a base member supported on the table 2. The base member 15 is so shaped and constructed that it encloses the gear 11 and driving pinion therefor. Centrally, the base member 15 is formed with an opening through which the shaft 10 and hub member thereon extends. The base member 2 may be provided with an integral, radially extending bracket 16, the purpose of which will be later set forth.

17 indicates a support connected to the upper end of the shaft 10 and arranged to receive the tank body, indicated at A, and the head, indicated at $a$, to be seamed thereto. In the present illustrative form of the mechanism, the seaming operations are carried out at the lower end of each body A and the head $a$ seamed thereto preferably becomes the top of the tank or receptacle. The bottom of the receptacle may be secured to the body in any desired manner. The support 17 is preferably formed in its upper surface with a recess $17^a$, having an inclined side wall $17^b$ to receive the head $a$ which is provided with a flange 18 having an inclined section $18^a$ adapted to seat on the wall $17^b$ and an up-standing section $18^b$, as will more fully be set forth. The support 17 is preferably detachably connected to the shaft 10 so that it may be removed and a support of a different diameter substituted according to the size of the tank to be made at any time. The bottom of the recess may be a plane surface and the head $a$ may be flat and engage with such surface; or such surface may be concaved slightly and the head correspondingly shaped, so that the latter, when the tank is in use, will form a slightly convexed surface, thus insuring the flow of any liquid dropping or accumulating on the head off therefrom over the side edges of the tank. In the use herein of the terms "flat" or "plane", I intend to comprehend thereby a head which may be slightly curved.

19 indicates a plate adapted to engage the upper end of the body A and hold it and the head $a$ firmly on the support 17. The plate 19 is fixed to the lower end of a rod 19′ slidably mounted in guides 20, which are provided on the cross member 4, and bearings 21 provided on a cross piece 22. The cross piece 22 is adjustably connected at its opposite ends to the upright frame members 3.

23 indicates a sleeve fixed to the rod 19′, preferably above the cross member 4, having collars $23^a$ which form bearings for the bifurcated end of a lever 24, whereby the latter is pivotally connected to the sleeve. The lever 24 is pivotally supported in any well known manner, preferably in a bracket $24^a$, on the cross member 4 and counterbalanced at its outer end, as shown at 25. 26 indicates devices for operating the lever 24 about its pivot to raise and lower the rod 19′. The rod is raised to disengage the plate from the body (see dotted lines in Fig. 1) and thus permit the positioning of a tank body on the support 17 and its removal therefrom; it is lowered to move the plate 19 into engagement with the body and thus clamp it firmly on the support 17 and hold the body thereon during the rotation of the support 17 and the forming of the seam. The devices 26 preferably comprise a pair of links 27, $27^a$, connected at their remote ends to the lever 24 and a rock shaft 28, respectively. The rock shaft 28 is connected through an arm 28ᵃ to a rod 29 which is operated by means 30, such as a compressed air operated piston, controlled by a lever 30ᵃ. The operating means 30 may comprise a cylinder 30ᵇ containing a piston and a valve mechanism to admit air to either side of the piston, whereby it may operate the rod 29 by a rod 30ᶜ and bell crank 30ᵈ mounted on the cross member 4. The compressed air operated piston not only serves to move the clamping plate 19 into engagement with the drum A or a head $a$ which may have been previously connected thereto, but by maintaining the air pressure on the piston, it may be utilized to effect a yielding engagement of the plate 19 with the tank body A while the seaming operation between it and a head $a$ on the support 17 takes place for a purpose which will later appear.

The cross piece 22 is preferably so connected to the frame members 3 and 4 that it can be adjusted to different positions according to the size of drum or tank to be seamed. As these supporting and adjusting devices form no part of my present invention, a detail description thereof will not be necessary.

31 indicates as an entirety the mechanism for folding or bending the flange 18′ of the container body A and the flange 18 of a head $a$ into interlocking relation ready for a rolling down operation to compress the sections of the folded flanges into close face to face relation to complete the seam and thus permanently secure the head and body together in a liquid tight manner. The folding or bending mechanism 31, in the form of construction shown in Figs. 1 to 6, inclusive and 8 to 10, inclusive, is constructed to provide for movement of the seaming device horizontally, preferably radially of the axis of the body A, and then laterally, that is, downwardly. This latter movement may be in a rectilinear direction, but to simplify the construction and the means for guiding and effecting this movement of the seaming device, the seaming device is mounted on the end of a relatively long arm that is pivoted at its opposite end, as will be later set forth. Of this folding or bending mechanism, 32 indicates a base secured in any desired manner to the bracket 16. At its outer end, the base 32 is provided with an up-standing lug 33 in which is formed a screw threaded opening 33ᵃ, adapted to receive a feed screw 34; the lug 33 thereby serving as a nut for the screw 34. At its outer end the feed screw 34 has fixed to it a relatively large wheel 35, by means of which the screw 34 may be rotated in either direction. At its inner end the screw 34 is reduced to form a shaft 34ᵃ rotatably fitting an opening 36 in a slide or carriage 37. The slide 37 may comprise a shoe 37ᵃ slidably fitting ways 32ᵃ formed in the base 32 and held therein by overhanging strips 38, and a vertically disposed web 37ᵇ having a flange 37ᶜ. The ways 32ᵃ are parallel to an imaginary line preferably extending radially of the axis of the container body A. As shown in Figs. 1, 3 and 4, the rear or outer end of the shoe 37ᵃ is provided with an up-standing lug 37ᵃ′ in which the opening 36 is formed. The shaft 34ᵃ is provided with a collar or nut 39 on its inner end which bears against the inner face of the lug 37ᵃ′. Due to the engagement of the collar 39 and the shoulder resulting by reducing the end of the screw 34 with the lug 37ᵃ′, the shaft 34ᵃ is connected to the slide 37 so that when the screw 34 moves endwise in either direction, due to its rotation, it carries the slide 37 with it, the purpose of which movement will later appear. The inward radial movement of the slide is limited by a stop 31′, which may be adjusted so as to stop the seaming device when the first seaming operation is completed to keep it from engaging the body A, and also to dispose it in position to effect the second seaming operation. The stop 31′ may comprise a lateral extension on one of the strips 38 having a threaded opening for a bolt 31ᵃ, the free end of which is disposed in the path of movement of the lug 37ᵃ′ and is engaged thereby when the shoe is operated toward the body A. The bolt 31ᵃ is rotated to adjust its free end so as to stop the shoe and through it the seaming device at the proper position. 40 indicates an arm pivotally connected at one end to the slide 37, preferably upon the web 37ᵇ thereof, and adapted to swing upwardly and downwardly thereon. The arm may comprise a base portion 40ᵃ, having a flat face slidably engaging the inner face of the web 37ᵇ and guided thereby, and spaced bearing blocks or lugs 40ᵇ formed with aligned openings to rotatably support a shaft or spindle 41, carrying at its outer end a seaming device 42 to which reference will later be made. The pivot connection for the arm 40 preferably comprises a bolt 40′ extending through openings formed in the web 37ᵇ and arm 40, the bolt being held in position by a suitable nut 40″. The arm 40 may be and preferably is held against lateral movement away from the web 37ᵇ by a plate 43 extending from the shoe 37ᵃ to the flange 37ᶜ and suitably secured thereto—see Figs. 4ᵃ, 5 and 6. As shown in Fig. 4ᵃ, both side faces of the outer bearing block 40ᵇ are flat and such block has a width adapting it to fit between the web 37ᵇ and plate 43, so as to be guided between them vertically about the pivot 40′. The spindle 41 is held against endwise movement in the bearing blocks 40ᵇ by the hub of the seaming device 42 and a collar 44, engaging the opposite ends of the inner block 40ᵇ.

45 indicates devices for adjustably supporting the arm 40 in what may be termed its normal operating position, that is, that position in which the seaming device carried by the arm 40 will engage the up-standing flange section 18$^b$ of the head flange 18, as the slide 37 is moved radially toward the container body A by the operation of the wheel 35 and fold it over upon the body flange 18' in carrying out one step of my improved process. This normal position is such that the lower edge of the seaming device 42 will move in a horizontal plane, in effecting the step just referred to, slightly above the flange 18', so that through its engagement with the flange section 18$^b$, the seaming device will bend or fold this section from the position shown in Fig. 3 to the position shown in Fig. 5, flat upon the flange 18'. The supporting devices 45 preferably comprise a stop 46 disposed above the arm 40 and in position to be engaged thereby and a coiled spring 47 interposed between the arm 40 and the shoe 37$^a$ or other part of the slide 37. The spring 47 normally tends to swing the arm 40 upwardly against the stop 46, the position of which determines the normal operating position of the seaming device 42.

The stop 46 preferably comprises a bolt screw threaded in and extending through a threaded opening in the flange 37$^c$ (see Fig. 3), being locked in its adjusted position by one or more nuts 46$^a$ in a well known manner. By loosening the nuts 46$^a$ and turning the bolt 46, its inner or free end may be adjusted to position the arm 40 and through it the seaming device 42 at the desired position, either dependent upon the gage of the metal used in the manufacture of the containers or the size thereof. In connection with this adjustment, it will be understood that the support 17 may be raised or lowered, provision therefor being made between the support and the shaft 10 or (and by preference) between the shaft 10 and its driving gear 11. The spring 47 may engage suitable seats 48 provided on the shoe 37$^a$ and block 40$^b$ and these seats may have bosses that extend into the ends of the coil to prevent its displacement.

49 indicates as an entirety devices for operating the arm 40 to swing the seaming device laterally in a downward direction to effect another step of my process in forming a container or tank such as shown in Figs. 1 to 7, inclusive. The operating devices 49 preferably comprise a screw 50 extending through and engaging screw threads provided in an opening 51 formed in the flange 37$^c$, the opening 51 being preferably arranged to support the screw 50 at substantially right angles to the arm 40. At its outer end, the screw 50 carries a hand wheel 52, by means of which it may be rotated, which operation will move the end of the screw downwardly and thus act through the arm 40 to move the seaming device 42 from the position shown in Fig. 5 to the position shown in Fig. 6, thereby bending or folding the flange section 18$^b$ and body flange 18' into close relation, face to face, with the flange section 18$^a$, and completing another step of my process in forming a container of the construction shown in Figs. 1 to 7, inclusive. As will be understood from the foregoing description, the arm 40 is mounted to swing on a horizontal axis, and being disposed in a plane that is radial of the axis of the body A, its movement downwardly, due to operation of the screw 50, will be in this radial plane. 53 indicates a stop for limiting the downward movement of the arm 40 to prevent undue pressure on the flanges by operation of the seaming device to a point beyond that required to carry out this last referred to step of seaming the flanges 18$^b$, 18', into folded relation with the flange section 18$^a$. A stop 53 is preferably mounted on the screw 50, in which arrangement it may comprise one or more nuts 54, thereby providing a simple form of adjustment for the stop to regulate the throw or movement of the arm 40 and through it the seaming device 42.

From the foregoing description it will be seen that I provide a novel form of support for the container head capable of maintaining it in concentric relation to the axis about which the head is rotated while the seaming operation is being carried out; this result being effected by providing the support 17 with the annular wall 17$^b$ which is inclined and forming the head $a$ with the flange section 18$^a$ that is inclined (preferably at an angle corresponding to the angle of the wall 17$^b$) and capable of engaging the wall 17$^b$. It will also be noted that the flange 18' of the body A rests on the inclined flange section 18$^a$, preferably at substantially the line of fold between the section 18$^a$ and section 18$^b$, so that the inclined flange section 18$^a$ serves to maintain the body in concentric relation to the head $a$. Furthermore, in the form of construction described, the seaming device 42 is above the lower end of the body A; hence during rotation of the body and head, the seaming device will prevent the disalignment of the body. As a result of this form of construction, I am enabled to produce containers that are flat at their ends with the seams between their heads and body portions disposed around the sides of the latter.

In performing the process for producing a container or tank such as shown in Fig. 7, I first provide a head $a$ having flange sections 18$^a$, 18$^b$, the former being inclined at approximately 30 degrees and the latter disposed at substantially right angles to the head *a*. The head and flanges are formed from suitable sheet stock of any desired gage. Next, I take a sheet of suitable gage stock and cut it to the desired size and roll it into cylindrical shape, connecting its side edges together in any well known manner and provide on one end a flange 18′ in any desired manner. Next, I assemble the head *a* on the support 17 with its flange section 18$^a$ seated against the wall 17$^b$ and position the body A on the head, that is, with its flange 18′ engaging the flange section 18$^a$ of the head *a*. By preference (1) the periphery of the flange 18′ will be adjacent the line of fold between the flange sections 18$^a$, 18$^b$, so that the latter flange section may be folded over the edge of the flange 18′, and (2) each flange section 18$^a$, 18$^b$, has a width substantially equal to the width of the flange 18′, so that when these sections are folded into close face to face relation with the flange 18′ there will be three thicknesses of metal throughout the resulting seam devoid of spaces to permit of leakage. I then operate the lever 30$^a$ to move the clamping plate 19 into yielding engagement with the upper end of the body A. Next, I set the shaft 10 in operation, and operate the wheel 35, thereby moving the seaming device 42 horizontally inwardly in a direction that is radial of the body A from the position shown in Fig. 3 to the position shown in Fig. 5, this movement continuing until the shoe 37 is stopped by the stop 31′. As the flange section 18$^b$ is disposed in the path of movement of the seaming device 42, it is folded downwardly as shown. By this movement I effect what may be termed the first seaming operation.

Next, I roll, bend or fold the flange 18′ and flange section 18$^b$ downwardly into face to face relation with the flange section 18$^a$, as shown in Fig. 6, thereby interlocking the flange 18′ and flange sections 18$^a$, 18$^b$ with each other. This step may be termed the second seaming operation and is effected by movement of the seaming device 42 downwardly while the body A and head *a* continue to rotate, as already set forth, this movement resulting from the operation of the hand wheel 52 and projection of the free end of the screw 50. In carrying out this second seaming step, the body A is moved downwardly into engagement with the head *a*, the pressure of the air on the piston in the cylinder 30$^b$ transmitted through the instrumentalities already described and plate 19 assisting in and co-operating with the seaming device 42 to move the body A downwardly so that its end at all points circumferentially will engage the inner face of the head *a*.

Next, I roll the interlocked or folded flanges down against the side wall of the body A. In performing this step, I prefer to remove the body A and head *a* from the support 17 and position it on a rotating member having a mandrel fitting against the inner side wall of the body A and applying under pressure a suitable roller to the folded flanges to roll them against the outer side wall of the body. This step may be termed the third or final seaming operation and may be carried out on a machine shown for illustrative purposes in Figure 7.

Referring to Fig. 7, 55′ indicates a base on which are fixed suitable standards 55. The standards 55 are provided with pairs of bearings 56, 57, the former rotatably supporting a shaft 58 and the latter supporting a rod 59, the purpose of which will later be set forth. At its inner end, the shaft 58 is provided with a gear 60 with which meshes a pinion 61 fixed to a countershaft 62, also mounted in suitable bearings 63 provided on the standards 55. The shaft 62 is provided with fast and loose pulleys 64, 65, arranged to be driven by a belt 66. On its outer end, the shaft 58 is provided with a supporting member 67 having a mandrel 68 on its free end. As shown in this view, the body A fits over the member 67 and is supported thereby. The supporting member 67 may have a diameter approximately equal to the interior diameter of the body or it may be of less diameter and thus be utilized for use in connection with different sizes of container bodies.

The shaft 58 serves to rotate the supporting member 67 and the latter in turn serves to rotate the body due to its engagement therewith resulting from the pressure of a rolling down roller 69 to which reference will later be made. 70 indicates a bracket removably mounted on the free end of the rod 59 and shaped to provide a pair of guides in which is slidably supported a slide 71. The slide 71 is provided with a pair of depending spaced arms 72, 72$^a$ (the latter being an extension of the base portion of the slide), having bearings for a shaft 73. The shaft carries the roller 69, the periphery of which is shaped to engage the folded or interlocked flanges 18$^a$, 18$^b$, 18′, and roll them into close engagement with the side wall of the body A. The roller 69 may be provided with a flanged portion 69$^a$ which extends around the seam, thereby guiding the body as it rotates and preventing spreading of the seamed flanges outwardly beyond the plane of the head *a*. At its upper end, the bracket 70 is provided with a cross head 74 in which is formed a screw threaded opening. 75 indicates a screw fitting the screw threaded opening in the cross head and carrying a wheel or other suitable device 76, whereby the screw may be rotated. The free end of the screw 75 engages the slide 70 to force it downwardly toward the body A to effect pressure of the roller 69 upon the seamed flanges 18$^a$, 18$^b$, 18′, and thus insure their complete rolling down against the body side wall.

Figs. 8, 9, 10 and 11 illustrate the process wherein it is adapted to the making of a container or tank having the seam between the head and body disposed around the side wall of the latter and substantially flush therewith. In these views, 17″ indicates the support for the head $a'$ and body $A'$, being similar in construction to the support already described. 42′ indicates the seaming device supported and operated in a manner similar to that already described in connection with construction shown in Figs. 1 to 6, inclusive. In carrying out the process illustrated in these views, the head $a'$ is formed as already described and the body $A'$ is provided with a flange 18′ and its side wall is formed with an annular recess B adjacent to the inner edge of the flange. The recess B is formed by rolling the side wall of the body in any well known way. The bottom wall of the recess B is substantially parallel to the body side wall and has a width equal to the width of the seamed flange sections and it is off-set inwardly sufficient to permit the seamed flange sections when rolled thereinto to occupy the recess with their outer section substantially flush with the body side wall.

Next, the head $a'$ and body $A'$ are assembled on the support 17′ (see Fig. 8) and the latter rotated. Next, the flange section $18^b$ is folded or bent over upon the flange 18′, to perform the first seaming operation, this step being effected by movement of the seaming device 42′ horizontally in a direction radial of the body $A'$, as shown in Fig. 9. Next, the flange section $18^b$ and flange 18′ are forced downwardly into closed relation with the flange section $18^a$ to perform the second seaming operation, this step of my process being effected by movement of the seaming device 42′ downwardly, as shown in Fig. 10; this operation, due to the pressure of the seaming device supplemented by the compressed air operated means, moving the body $A'$ into close engagement with the head $a'$. Next, the folded or interlocked flange sections $18^a$, $18^b$ and the flange 18′ are rolled into the recess B, as shown in Fig. 11, the final step being effected by the roller 69′.

Figs. 12, 13 and 14 illustrate a modified form of construction wherein a container or tank having a flangeless or chimeless head with the seam disposed around the side wall of the body is made by a process in which the seaming operations are reduced in number. Referring to these views $a^x$ indicates the head having a flange $18^{ax}$ bent upwardly at an inclined angle. $A^x$ indicates the body of the container provided with a flange $18^x$ bent upwardly at an inclined angle, preferably corresponding to the inclination of the flange $18^{ax}$ so as to lie in face to face relation therewith. As shown, the head flange $18^{ax}$ has a width greater than the flange $18^x$ (preferably approximately twice its width) so that it may be rolled or bent over the flange $18^x$ in effecting the first seaming operation. In this form of construction, due to the arrangement of the flange $18^x$, the body $A^x$ rests at its end on the head $a^x$, when assembled for the seaming operation—see Fig. 12.

$42^x$ indicates the seaming device. This device is supported to move downwardly in a direction substantially edgewise of the flanges $18^{ax}$, $18^x$ to effect a rolling or bending thereof. The seaming device $42^x$ may be supported to move in a rectilinear direction in the plane of or parallel to the flanges $18^{ax}$, $18^x$, but by preference it is pivoted on a support, for example, in a manner similar to the device 42 already described and operated downwardly by similar operating means, for which reasons the pivotal mounting and operating means are not shown. This form of construction is preferable on account of its simplicity and the seaming operation may be readily carried out because the seaming device $42^x$ swings on a relatively long radius, so that its arc of movement approximates a straight line. In this form of construction, the active face of the seaming device $42^x$ is formed with a groove $42^{x'}$ shaped to cause the edge of the flange $18^{ax}$, as the device moves downwardly, to bend laterally and roll over on itself with the flange $18^x$ interlocked underneath the rolled over portion, as shown in Fig. 13. In seaming the head $a^x$ and body $A^x$ according to this modified process, the head and body are respectively provided with the flanges $18^{ax}$, $18^x$ and then assembled on a rotatable support; next, the flange $18^{ax}$ is rolled or bent over on the flange $18^x$ to perform the first seaming operation. This step of my process is effected by the movement downwardly of the seaming device $42^x$ from the position shown in Fig. 12 to the position shown in Fig. 13. Next, the body $A^x$ and head $a^x$ are positioned on the mandrel, and the main and rolled portions of flange $18^{ax}$ and the flange $18^x$ are rolled down into close face to face relation with each other and against the side wall of the body $A'$, to perform the second and final seaming operation to complete the same. This final step is preferably performed on a machine such as shown in Fig. 7. This final step is shown in Fig. 14 where a portion of the mandrel 68 is shown on the inner side of the container body $A^x$ and the rolling down roller 69 is engaging the seamed portions of the flanges to roll them down into their final position. Where it is desired to make the seam flush with the body side wall, the latter is formed with a recess B′ (see Fig. 15), as already described in connection with Figs. 8, 9, 10 and 11. It will thus be seen that in this modified process, the seam may be disposed exteriorly of the body side wall or countersunk to lie flush therewith.

It will be noted from Fig. 13 that the metal of the flanges 18$^{ax}$, 18$^x$ at the end of the first seaming operation is in a curved condition, resulting from the method of carrying out this step; however, in carrying out the next step (see Fig. 14), the sections of the flanges 18$^{ax}$ and the flange 18$^x$ are rolled flat in face to face relation, thus forming a liquid tight seam or joint.

In the process or method carried out on the mechanism shown in Figs. 12 and 13, I prefer to bend the free edge of the flange 18$^{ax}$ inwardly slightly, as shown at 18$^c$, the purpose of which is to facilitate the rolling operation, by making it easier for the seaming device 42$^x$ to start the metal in its rolling movement.

Fig. 15 illustrates a container having a head seamed to its body by either form of process herein disclosed, with the seam disposed flush with the container side wall. In this form of construction, the end of the container is flangeless or chimeless, thereby providing a smooth or plane surface capable of being kept free from dirt and other material. By convexing the surface as shown in dotted lines, there will be a tendency for any dirt or liquid material to flow off at the sides of the head or top $a$. The container or tank herein shown will form the subject-matter of a separate, co-pending application, for which reason no claim to the container or tank is made in this application.

The joint or seam resulting from either form of process is liquid and gas tight, so that the container may be used for storing or shipping any kind of materials.

In my improved construction and according to my process I seam the head to the side wall of a tank body in a ready and easy manner without danger of spreading the flanges or the sections thereof, thus insuring positive operations of the seaming device.

Where it is found that additional pressure is required in carrying out the second seaming operation of my process described in connection with Figs. 1 to 11, inclusive, I may move the shoe 37 outwardly following the downward movement of the seaming device, thus forcing the inner wall of a seaming device against the flanges in a radial direction outwardly.

It will be noted that I provide a novel form of seaming device in Figs. 1, 2, 3, 4$^a$, 5, 6, 8, 9 and 10. This device is shaped to form a tapered rim thereby providing two active faces 77, 78, the former face acting on the flange section 18$^b$ while moving inwardly toward the body and the latter face acting on the flange section 18$^b$ while moving downwardly.

In the foregoing description I have used the term "upwardly" in connection with the flanges for the head and body for convenience since the illustrated form of mechanism shows the head supported horizontally and the body disposed vertically thereon; but in such use no limitation is to be imposed on the scope of the invention since it will be understood that these elements may be arranged with the head in vertical position and the body disposed horizontally and the seaming effected while they are in these positions; or these elements may be reversed, that is, the head $a$ positioned on the upper end of the body A and the seaming device disposed to effect the seaming operations first horizontally and then upwardly.

In the product formed by my improved mechanism and according to my process, the tank has a neat and smooth outline or appearance, the seam being substantially countersunk into the side wall of the tank, the top being flat and the peripheral edge being flangeless or chimeless; thereby eliminating a ring or obstruction around the edge of the top to collect dirt, grit and liquid, and providing a surface which may readily be cleaned. This form of construction adapts the tank most advantageously for use as part of a dispensing mechanism for liquids and oil and similar materials. Where the tank is used to store gasoline, oil, grease or other lubricant and has associated with it a dispensing means therefor, accumulation of such material on top of the tank, as well as grit and dirt, is avoided. By reason of the smooth exterior surface of the tank and the planular shape of its top, it may be readily cleaned and polished.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination of a support for a flanged body and a flanged head, means for rotating said support, a seaming mechanism having flange engaging means disposed inwardly of the body end and movable radially and then in a lateral direction, and means for operating said mechanism.

2. In apparatus of the class described, the combination of a support for a flanged body and a flanged head, means for rotating said support, a seaming mechanism having flange engaging means disposed inwardly of the body end and movable radially and then in a lateral direction, means for operating said mechanism, and a stop for limiting the movement of said flange engaging means in one of said directions.

3. In apparatus of the class described, the combination of a support for a flanged body and a flanged head, means for rotating said support, a seaming mechanism having flange engaging means disposed inwardly of the body and movable radially and then in a lateral direction, means for operating said mechanism, and stops for limiting the respective movements of said flange engaging means.

4. In apparatus of the class described, the combination of a supporting means for a flanged head and a flanged body arranged to support the body with its flange above the head, means for rotating said supporting means, and mechanism for folding the flanges of said body and head into interlocking relation around the side wall of said body.

5. In apparatus of the class described, the combination of a supporting means for a flanged head and a flanged body arranged to support the body with its flange above the head, means for rotating said supporting means, mechanism for folding the flanges of said body and head into interlocking relation around the side wall of said body, and means for moving the body downwardly while the folding operation takes place.

6. In apparatus of the class described, the combination of supporting means for a flanged head and a flanged body arranged to support the body with its flange above the head, means for rotating said supporting means, mechanism for folding the flanges of said body and head into interlocking relation around the side wall of said body, and means for yieldably moving the body downwardly while the folding operation takes place.

7. In apparatus of the class described, the combination of supporting means for a flanged head and a flanged body, means for rotating said supporting means, a seaming device disposed inwardly of the body end, means for moving said device radially of said body, and means for moving said device at an angle to said radial direction.

8. In apparatus of the class described, the combination of supporting means for a flanged head and a flanged body, means for rotating said supporting means, a seaming device disposed inwardly of the body end, means for moving said device radially of said body, and means for moving said device downwardly in said radial plane.

9. In apparatus of the class described, the combination of a supporting means for a flanged head and a flanged body, means for rotating said supporting means, a seaming device disposed inwardly of the body end, means for moving said device radially of said body, means for moving said device at an angle to said radial direction, and an adjustable stop for limiting the movement of said device in one of said directions.

10. In apparatus of the class described, the combination of a supporting means for a flanged body and a head having a flange extending inwardly of the body end and beyond its flange, means for rotating said supporting means, a seaming device, means for supporting and moving said device radially of said body in the plane of the inner surface of said body flange to fold the extended portion of the flange of said head thereon, and means for moving said device outwardly relative to the body end to interlock the sections of said head flange and said body flange together.

11. In apparatus of the class described, the combination of a supporting means for a flanged body an a head having a flange extending inwardly of the body end and beyond its flange, means for rotating said supporting means, a seaming device, means for supporting and moving said device radially of said body in the plane of the inner surface of said body flange to fold the extended portion of the flange of said head thereon, means for moving said device outwardly relative to the body end to interlock the sections of said head flange and said body flange together, and means for limiting the radial movement of said device.

12. In apparatus of the class described, the combination of a supporting means for a flanged body and a head having a flange extending inwardly of the body end and beyond its flange, means for rotating said supporting means, a seaming device, means for supporting and moving said device radially of said body in the plane of the inner surface of said body flange to fold the extended portion of the flange of said head thereon, means for moving said device outwardly relative to the body end to interlock the sections of said head flange and said body flange together, and means for limiting the outward movement of said device.

13. In apparatus of the class described, the combination of a supporting means for a flanged body and a head having a flange extending inwardly of the body end and beyond its flange, means for rotating said supporting means, a seaming device, means for supporting and moving said device radially of said body in the plane of the inner surface of said body flange to fold the extended portion of the flange of said head thereon, means for moving said device outwardly relative to the body end to interlock the sections of said head flange and said body flange together, means for limiting the radial movement of said device, and means for limiting the outward movement of said device.

14. An apparatus as claimed in claim 10 in which means are provided for pressing the body toward the head during outward movement of the seaming device.

15. In apparatus of the class described, the combination of a member for supporting a flanged head the flange of which comprises an inclined section and an up-standing section and a body having a flange resting on said inclined section of the head flange, means for rotating said member, a seaming device, means for moving said device radially of said body to fold said up-standing flange section of the head over into engagement with the body flange, and means for moving said device downwardly to position said folded head flange section and body flange against the inclined section of said head flange.

16. In apparatus of the class described, the combination of a rotatable member provided with an inclined side wall for receiving a flanged head the flange of which comprises an inclined section seating on the side wall of said rotatable member and an up-standing section and a body having a flange resting on said inclined section of the head flange with its periphery disposed at the intersection of the sections of said head flange, means for rotating said member, a seaming device, means for moving said device radially of said body to fold said up-standing flange section of the head over into engagement with the body flange, and means for moving said device laterally to position said folded head flange section and body flange against the inclined section of said head flange.

17. An apparatus as claimed in claim 15 in which the seaming device comprises a roller having an inclined side wall arranged to engage the flanges to effect their folding against the inclined section of the head flange.

18. In apparatus of the class described, the combination of a frame, supporting means on said frame for a flanged head and a flanged body, means for rotating said supporting means, a slide on said frame, a seaming device mounted to move bodily on said slide, means for moving said slide radially of the body whereby the seaming device effects a step in seaming the flanges of the head and body, and means for moving said device bodily on said slide, whereby it effects another step in seaming the flanges of the head and body.

19. In apparatus of the class described, the combination of a frame, supporting means on said frame for a flanged head and a flanged body, means for rotating said supporting means, a slide on said frame, a seaming device mounted to move bodily on said slide, means for moving said slide radially of the body whereby the seaming device effects a step in seaming the flanges of the head and body, a spring normally maintaining said device in position to effect said seaming step, and means for bodily moving said device against the tension of said spring whereby it effects another step of seaming the flanges of the head and body.

20. An apparatus as claimed in claim 19 in which an adjustable stop is provided to limit the movement of said device under the influence of said spring.

21. In apparatus of the class described, the combination of a supporting means for a flanged head the flange of which is inclined inwardly of the body end and a body having a flange engaging the flange of the head, a seaming device bodily movably outwardly of the body end and at substantially an angle to the body for interlocking the flanges of the head and body, and means for operating said device.

22. An apparatus as claimed in claim 21 in which a stop is provided to limit the movement of the seaming device in one direction.

23. In apparatus for making containers having flat heads, the combination of supporting means for a body having a flange and a head having a flange extending laterally and inwardly beyond the body end, and a seaming device disposed in a horizontal plane inwardly of the body end and bodily movable to effect a folding of the head flange over the body flange.

24. In apparatus for making containers having flat heads, the combination of supporting means for a body having a flange and a head having a flange extending laterally and inwardly beyond the body flange, and a seaming device disposed in a horizontal plane inwardly of the body end and bodily movable first horizontally in a radial direction and then outwardly relative to the body end to effect a folding of the flanges into interlocking relation.

25. The herein disclosed process which consists in forming a container body with a flange, in forming a head having an inclined flange, then in positioning the body on the head with its flange engaging the head flange, then in bending the free edge of the head flange over into engagement with the body flange, and finally rolling down the flanges around and in engagement with the side wall of the body.

26. The herein disclosed process which consists in forming a container body with a flange, in forming a head with a flange having an inclined section and an up-standing section, then in positioning said body in operative relation to the head with its flange engaging the inclined section of the head flange, then in bending the up-standing section over into engagement with the body flange, and finally in pressing the last mentioned sections into engagement with the inclined section of the head flange.

27. The herein disclosed process which consists in forming a container body with a flange, in forming a head with a flange having an inclined section and an up-standing section, then in positioning said body in operative relation to the head with its flange engaging the inclined section of the head flange, then in bending the up-standing section over into engagement with the body flange, and finally pressing all of the flange sections together in face to face relation around and in engagement with the body of the container.

28. The herein disclosed process which consists in forming a container body with a flange, in forming a head with a flange having an inclined section and an up-standing section, then in positioning said body in operative relation to the head with its flange engaging the inclined section of the head flange, then in bending the up-standing section over into engagement with the body flange, then in pressing the last mentioned sections and the inclined sections of the head flange together, and finally rolling down all the folded flange sections in engagement with the side wall of the container body.

29. The herein disclosed process which consists in forming a container body with a flange, in forming a head with a flange having an inclined section and an up-standing section, then in positioning said body in operative relation to the head with its flange engaging the inclined section of the head flange, then in bending the up-standing section over into engagement with the body flange, then in pressing the last mentioned sections and the inclined section of the head flange together, while pressing the body toward the head, and finally rolling down all the folded flange sections in engagement with the side wall of the container body.

30. The herein disclosed process which consists in forming a container body with a flange, in forming a head with a flange having a width approximately twice the width of the body flange and up-setting it to form an inclined section and an up-standing section, then in positioning the body in operative relation to the head with its flange engaging the inclined section of the head flange, then in bending the up-standing section of the head flange over and upon the body flange, and finally in rolling the folded section and other section of the head flange and the body flange into a closed seam around the body and in engagement therewith.

31. The herein disclosed process which consists in forming a container body having a flange, in forming a flat head with a flange bent outwardly and inwardly relative to the body end to a point beyond the body flange when the body and head are assembled for seaming, then in positioning the body above the head with their flanges in operative relation, then in bending the free edge of the head flange over on the body flange, and finally rolling the flanges into closed relation and in engagement with the body.

32. The herein disclosed process which consists in forming a container body having a flange, in forming a flat head with a flange bent outwardly and inwardly relative to the body end to a point beyond the body flange when the body and head are assembled for seaming, then in positioning the body above the head with their flanges in operative relation, then in bending the free edge of the head flange over on the body flange, then in compressing the folded edge of the head flange and body flange and the unfolded portion of the head flange together, and finally rolling the flanges into engagement with the body.

33. In apparatus of the class described, the combination of a support for a flanged head and a flanged body, an annular wall around said support, for retaining said head and body in concentric relation, means for rotating said support, a seaming device, means for moving said device radially of said body to fold the outer portion of said head flange on said body flange, and means for moving said device downwardly to fold said folded portion and body flange against said wall.

34. In apparatus for seaming the flanges of continuous heads and bodies, the combination of a support for a container head, an inclined wall surrounding said support and carried thereby, the flange of the body resting on the outer portion of the inclined flange of the head and the latter flange engaging said inclined wall, whereby the head and body are held in concentric relation to the axis of said support, means for rotating said support, and mechanism disposed above said support and operable to bend the flanges of said body and head into interlocking relation around the side wall of said body.

35. In apparatus of the class described, the combination of supporting means for a body having a lateral flange at its end and a flanged head with its flange extending inwardly of the body end and beyond its flange, means for rotating said supporting means, and mechanism disposed in a plane inwardly of the body end and operable to bend the flanges of said body and head into interlocking relation around the side wall of said body.

36. In apparatus of the class described, the combination of supporting means for a body having a lateral flange at its end and a head having a flange extending inwardly of the body end and beyond its flange, means for rotating said supporting means, and a seaming device disposed inwardly of the body end and in the plane of the extended portion of the head flange, means for moving said device horizontally radially of said body, and means for moving said device outwardly relative to the body end.

37. The herein disclosed process which consists in forming a head having an inclined flange, in forming a container body with a flange at one end and an annular recess in its side wall adjacent its flange, then in positioning the body on the head with its flange engaging the head flange, then in bending the free edge of the head flange over into engagement with the body flange, and finally rolling down the flanges into said annular recess around the side wall of the body.

38. The herein disclosed process which consists in forming a head with a flange having an inclined section and an up-standing section in forming a container body with a flange at one end and an annular recess in its side wall adjacent its flange, then in positioning said body on the head with its flange engaging the inclined section of the head flange, then in bending the up-standing section over into engagement with the body flange, and finally in pressing all the flanged sections together and into said annular recess.

39. The herein disclosed process which consists in forming a head with a flange having an inclined section and an up-standing section, in forming a container body with a flange at one end and an annular recess in its side wall adjacent its flange, then in positioning said body on the head with its flange engaging the inclined section of the head flange, then in bending the up-standing section over into engagement with the body flange, then in pressing the last mentioned sections into engagement with the inclined section, and finally pressing all of the flange sections together in face to face relation and into the said annular recess formed in the body of the container.

40. The herein disclosed process which consists in forming a head with a flange having an inclined section and an up-standing section, in forming a container body with a flange at one end and an annular recess in its side wall adjacent its flanges, then in positioning said body on the head with its flange engaging the inclined section of the head flange, then in bending the up-standing section over into engagement with the body flange, then in pressing the last mentioned sections and the inclined section of the head flange together, and finally rolling down all the folded flange sections into said annular recess and in engagement with the body of the container.

41. The herein disclosed process which consists in forming a head with a flange having an inclined section and an up-standing section, in forming a container body with a flange at one end and an annular recess in its side wall adjacent its flange, then in positioning the body on the head with its flange engaging the inclined section of the head flange, then in bending the up-standing section over into engagement with the body flange, then in pressing the last mentioned sections and the inclined section of the head flange together, while pressing the body toward the head, and finally rolling down the folded flange sections into said annular recess and in engagement with the body of the container.

42. The herein disclosed process which consists in forming a container body with a flange at one end and an annular recess in its side wall adjacent its flange, in forming a head with a flange having a width approximately twice the width of the body flange and up-setting it to form an inclined section and an up-standing section, then in positioning the body in operative relation to the head with its flange engaging the inclined section of the head flange, then in bending the up-standing section of the head flange over and upon the body flange, and finally in rolling the folded section and other section of the head flange and the body flange into a closed seam in said annular recess around the body and in engagement therewith.

43. The herein disclosed process which consists in forming a container body having a flange, and an annular recess in its side wall adjacent its flange, in forming a flat head with a flange bent outwardly and inwardly relative to the body end to a point beyond the body flange when the body and head are assembled for seaming, then in positioning the body above the head with their flanges in operative relation, then in bending the free edge of the head flange over on the body flange, and finally rolling the flanges into closed relation and into said annular recess on the body.

44. The herein disclosed process which consists in forming a container body having a flange and an annular recess in its side wall adjacent its flange, in forming a flat head with a flange bent outwardly and inwardly relative to the body and to a point beyond the body flange when the body and head are assembled for seaming, then in positioning the body above the head with their flanges in operative relation, then in bending the free edge of the head flange over on the body flange, then in compressing the folded edge of the head flange and body flange and the unfolded portion of the head flange together, and finally rolling the flanges into said annular recess in the body.

45. In apparatus of the class described, the combination of support for a container head having an inclined flange and a container body, an inclined wall surrounding said support and engaging the head flange to hold the head in concentric relation to said support and the body in concentric relation to the head by the engagement of the periphery of its flange with the inclined head flange, means for rotating said support, and mechanism disposed in a plane above said support and operable to bend the flanges of said body and head into interlocking relation around the side wall of said body.

46. In apparatus of the class described, the combination of supporting means for a flanged body and a flanged head arranged to seat against the end of the body with its flange enveloping the body flange and extending beyond it, means for rotating said supporting means, and a device disposed in a plane above said means and operable to bend the flanges of said body and head into interlocking relation around the side wall of said body, said device serving to prevent transverse movement of the body on the head while the bending operation takes place.

47. In apparatus of the class described, the combination of support for a flanged body and a head having an inclined flange extending beyond the body flange, an inclined wall surrounding said support and engaging the head flange to hold the head in concentric relation to said support and the body in concentric relation to the head by the engagement of the periphery of its flange with the inclined head flange, means for rotating said support, and a seaming device disposed in a plane above said supporting means, means for moving said device horizontally to bend a portion radially of said body, and means for moving said device downwardly to compress the bent over flange portion and body flange and other portion of the head flange against said inclined wall.

48. A rotatable seaming device having a side wall adjacent its outer surface and forming an active face and a side wall inwardly inclined towards its inner surface relative to the periphery of the first mentioned side wall to form a separate active face.

49. In apparatus of the class described, the combination of a support for a flanged head on which is mounted a flanged container body, means for rotating said support, a seaming device having an active face on its outer end and an active face inwardly thereof, means for moving said device radially of the container body to fold a portion of the head flange over and upon the flange of the body, and means for operating said device laterally to fold said folded portion of the head flange and the flange of the body into face to face relation with the remaining portion of the head flange.

50. An apparatus as claimed in claim 49, in which means are provided for limiting the movement of said device in each direction.

51. An apparatus as claimed in claim 49, in which means are provided to act on the body to supplement the last mentioned movement of said device.

52. In apparatus of the class described, the combination of a support for a flanged head and a flanged container body wherein the flange of the head extends inwardly beyond the adjacent end of the body, means for rotating said support, a seaming device disposed in a plane inwardly of the adjacent end of the body, means for moving said device radially toward the axis of the body to fold a portion of the head flange over the body flange, and means for moving said device outwardly relative to the body to position the folded over portion of the head flange and the body flange in face to face relation with each other and with the remaining portion of the head flange.

53. In apparatus of the class described, the combination of a support for a flanged head and a flanged body wherein the flange of the head is disposed inwardly of the adjacent end of the body and a portion extends beyond the body flange, means for rotating said support, a seaming device disposed in a plane inwardly of the adjacent end of the body, and means for moving said device outwardly relative to the body end to fold the extended portion of the head flange over the body flange.

In testimony whereof, I have hereunto subscribed my name.

ANTHONY SCHROEDER.